Dec. 27, 1955  R. B. MORAN, JR  2,728,852
ECHO RANGING APPARATUS
Filed July 26, 1951  2 Sheets-Sheet 1
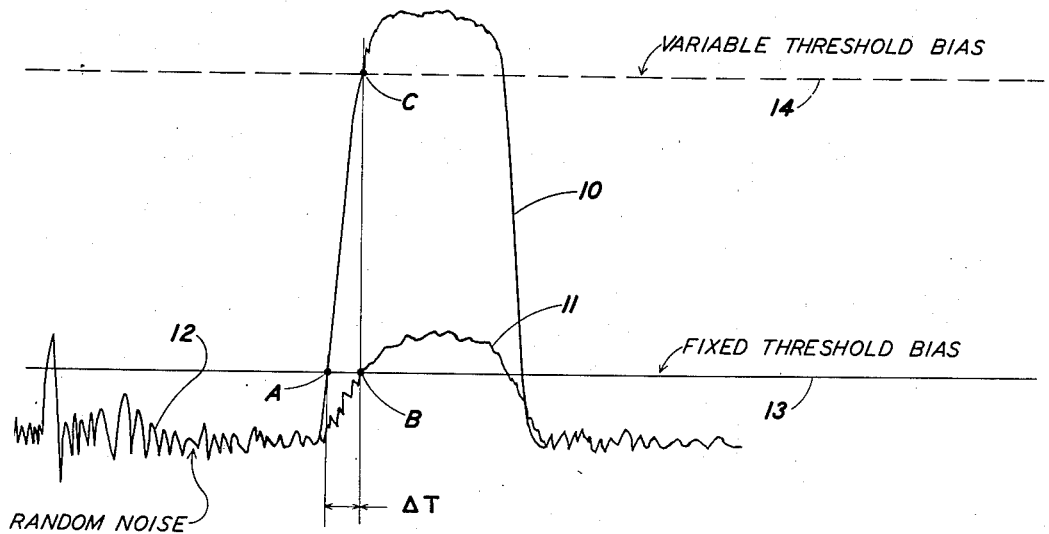
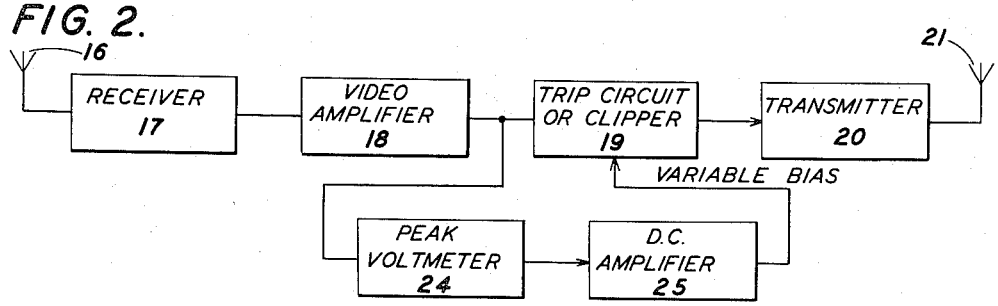
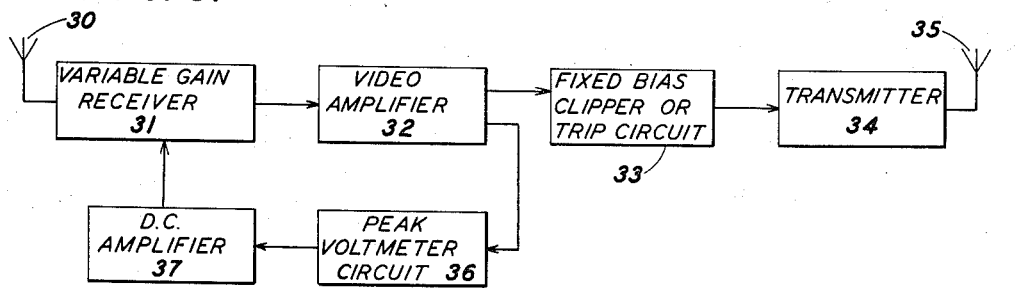
INVENTOR.
ROBERT B. MORAN
BY James B. Christie
ATTORNEY Dec. 27, 1955     R. B. MORAN, JR     2,728,852
ECHO RANGING APPARATUS Filed July 26, 1951                                                 2 Sheets-Sheet 2

INVENTOR.
ROBERT B. MORAN
BY *James B. Christie*

ATTORNEY

United States Patent Office 2,728,852
Patented Dec. 27, 1955

2,728,852
ECHO RANGING APPARATUS

Robert B. Moran, Jr., Pasadena, Calif., assignor to Moran Instrument Corporation, Pasadena, Calif., a corporation of California Application July 26, 1951, Serial No. 238,715

4 Claims. (Cl. 250—15)

This invention is concerned with echo ranging, which is the measurement of distance as a function of the time required for transmission and return of a signal from its point of origin to and from an echoing device. The invention is directed particularly to improvement in the accuracy of such measurements by the elimination of the error normally consequent upon variation in delay time at the echoing device.

The invention is described herein with particular reference to RF waves. However, it is also applicable in a variety of fields since the signal or pulse, which is the basis of the measurement, may be a radiated one, for example a RF pulse or a light pulse, or it may be an elastic wave, say a supersonic signal.

It has been proposed heretofore to measure the distance between two widely separated points by transmitting a pulse from one of the points to the other, receiving and retransmitting (transponding) the pulse at the other point back to the point of origin and determining the travel time of the pulse for the round trip.

The distance between the two points may then be determined as being equal to the travel time of the pulse minus the delay in retransmission, if any, multiplied by half the velocity of the particular type of pulse in the medium through which it is transmitted.

In echo ranging systems of this type it is the general practice to employ a plurality of so-called "beacon" or slave stations at fixed known locations and a movable "master" station capable of measuring the distance from the master station to any one of the beacon stations by transmission of a signal to the beacon station and retransmission from the beacon station to the master station. To locate the master station on the earth's surface the distance between the master station and two or more of the beacon stations is determined in this manner. Three-dimensional location of the master station requires three or more beacon stations, the position of the master station being ascertainable by triangulation.

One of the factors which limits the maximum accuracy obtainable in an echoing range system of the type described is the variation in delay in the beacon station between the moment of reception and the moment of retransmission. One of the principal causes of such variation in delay time is due to the variation in the strength of the received pulse or signal in the beacon receiver. At the present time to obtain high precision distance measurement it is necessary to manually adjust the beacon circuits so that this delay time is held constant. Such practice greatly decreases the efficiency and increases the expense of the process, since it means that each beacon station must have an operator on duty at all times.

The present invention provides automatic means for holding the over-all time delay constant in the beacon stations regardless of the signal strength of the integrating pulse which is being received. With such automatic means a precision beacon may be operated unattended without loss of accuracy.

In all beacon systems it is necessary to employ some form of threshold bias to prevent background "noise" from triggering the beacon. The variation in pulse strength received by the beacon results in a corresponding variation in the intercept between the received signal and the threshold bias unless measures are undertaken to hold the intercept constant by variation of one or more of the determinative parameters. In present practice manual control of the delay time takes the form of manual variation of the threshold bias as a function of signal strength. The effect of signal strength variation as related to the threshold bias will be more clearly explained with respect to the drawings.

The present invention contemplates in a radar transponder operable to transmit a signal responsive to a received triggering signal and provided with threshold bias to obscure random noise, the combination comprising means adapted to sense the peak amplitude of the triggering signal, and means responsive to the sensed peak amplitude to automatically maintain the relationship of peak amplitude to threshold bias substantially constant. To accomplish the purpose of the invention it is necessary to sense the peak value of the received triggering pulses. Since the duty cycle is ordinarily quite low in echo ranging systems of the type under consideration, operation of the automatic delay-time control cannot be based upon the average output signal. For this reason an ordinary radio automatic volume control circuit cannot be employed. In accordance with the invention it is necessary to use a peak reading voltmeter circuit of the pulse stretcher type, more clearly explained in relation to the drawings. If the repetition rate of the system is very low it may be necessary to employ two or more stages of pulse stretching to develop a control signal accurately proportional to the pulse height. This control signal may be amplified and used to vary the gain of the beacon station receiver, or the amplified control signal may be used to vary the threshold bias of the beacon station system, the results in either case being to hold the relationship of the bias to incoming peak signal strength at approximately a constant value.

The invention will be more clearly understood by reference to the following detailed description taken in conjunction with the accompanying drawings, in which:

Fig. 1 is a graph showing the relationship between pulse amplitude, threshold bias and delay time;

Fig. 2 is a block diagram of one embodiment of the invention;

Fig. 3 is a block diagram of another embodiment of the invention;

Figure 4:
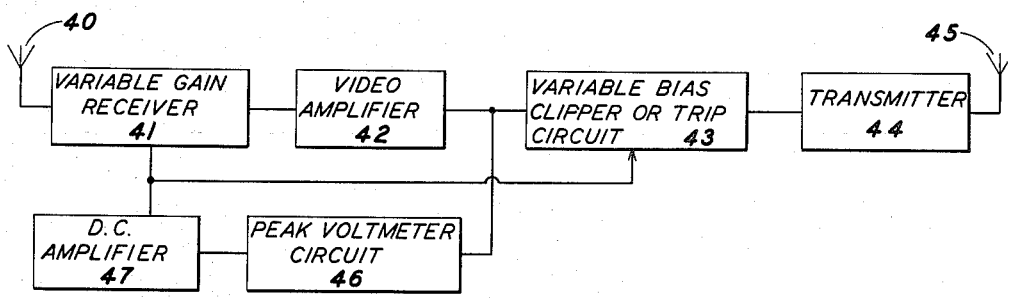
Fig. 4 is a block diagram of circuitry combining the novel features of the circuits of Figs. 2 and 3.

As mentioned above it is necessary in all beacon systems to employ some form of threshold bias to prevent random noise from triggering the beacon. Fig. 1 is a graph or chart showing the effect that this threshold bias has on the delay time of the beacon as a function of the strength of the received triggering pulse. In this figure curve 10 represents the output amplitude of a beacon receiver plotted against time as produced responsive to reception of a strong pulse, curve 11 is the output developed by the beacon receiver responsive to reception of a weak pulse, the two curves being superimposed to better illustrate the effects with which the invention is concerned. Curve 12 is the output of the beacon receiver developed responsive to reception of random noise, this noise of course being superimposed on any triggering pulse picked up by the receiver. The horizontal line 13 represents a hypothetical fixed threshold bias level intercepting the curves 10 and 11 at the points A and B respectively, and the dotted horizontal line 14 is included to illustrate the effects of a variable threshold bias on the delay time of the instrument.

With a fixed threshold bias, as represented by the line 13, the strong pulse 10 will trip the transmitter at intercept point A, while the weak pulse 11 will trip the transmitter at the intercept point B, the difference in pulse strength introducing the time delay error ΔT as constituting the displacement of the points A and B on the time line of the graph. This error in delay time is automatically avoided by the apparatus of my invention in either of two ways. The threshold bias may be varied and made proportional to the amplitude of the received triggering pulse. With reference to Fig. 1, for example, and assuming an amplitude spread of the triggering pulses as represented by the curves 10 and 11, the threshold bias is automatically varied in one embodiment of the invention within the limits defined by line 13 and line 14 so that the intercept of the received pulse and the threshold bias are invariant with respect to time. With the threshold bias varied to the value represented by the line 14, the intercept C of the pulse 10 and the bias 14 lies on the same point of the time line curve as the intercept B of the pulse 11 with the lower bias value 13.

One embodiment of the invention adapted to vary the bias, as explained above, and as illustrated in Fig. 1, is shown in the block diagram of Fig. 2. The circuit of Fig. 2 includes, as conventional elements of a beacon station, a receiving antenna 16, a receiving circuit 17, a video amplifier 18, a trip circuit or clipper 19, a transmitter 20 and a transmitting antenna 21. In the operation of such a conventional beacon unit the signal transmitted from the master station is received in the receiver 17, amplified in the amplifier 18, and if of such magnitude to exceed the bias of the trip circuit 19 will initiate a characteristic pulse transmission from the transmitter 20. The transmitted pulse is characteristic to the beacon station and is unrelated to the pulse pattern of the received signal. The trip circuit merely serves to trip the transmitter or initiate transmission therefrom responsive to receipt of a signal of a predetermined amplitude.

In accordance with the present invention there is included within the beacon station a peak volmeter 24 adapted to sense the peak amplitude of the received signal, the output of the peak voltmeter being used to vary the bias on the trip circuit 19. A D. C. amplifier 25 may be interposed between the peak voltmeter and the trip circuit to increase the sensitivity of the system. In this embodiment as the output of the video amplifier 18 varies responsive to variation in the amplitude of the incoming signal, the peak voltmeter senses the peak amplitude of the amplifier output and varies the bias of the trip circuit in accordance therewith. By this means the conditions illustrated in Fig. 1 by the intercept points B and C is automatically maintained and ΔT is eliminated as a factor to be considered in the distance measurement. Control of the bias responsive to the output of the peak voltmeter may be accomplished by any of a number of conventional means.

Another means of accomplishing the same end result is shown in the block diagram of Fig. 3 which includes a receiving antenna 30, a receiver 31, video amplifier 32, clipper or trip circuit 33, transmitter 34 and transmitting antenna 35 serially connected, a peak voltmeter 36 and a D. C. amplifier 37, the peak voltmeter being connected to the output of the video amplifier 32 and through the D. C. amplifier 37 into the receiver 31. In this embodiment the clipper or trip circuit 33 is provided with a fixed bias, and the receiver 31 is of a variable gain type. The output of the peak voltmeter, either directly or as amplified in the amplifier 37, is applied to the receiver 31 to vary the gain thereof responsive to the peak amplitude of the received triggering signal. In this manner variation in time delay is avoided by controlling the peak amplitude of the signal fed to the clipper or trip circuit so that this signal is of constant amplitude regardless of the amplitude of the received signal and will intercept the fixed bias at the same point time.

It is important to note, as heretofore mentioned briefly, that automatic volume control will not accomplish the purpose of the invention. This is true because the duty cycle of such an echo ranging system is ordinarily quite low. For this reason the circuit such as an automatic volume control circuit, which feeds back an over-all average output signal to control the gain of the receiver, is not sufficient and a peak sensitive circuit is required.

Fig. 4 is a block diagram showing a circuit combining the novel features of the circuits of Figs. 2 and 3. The beacon station of Fig. 4 includes an antenna 40, a variable gain receiver 41, a video amplifier 42, a variable bias clipper or trip circuit 43, a transmitter 44, a transmitting antenna 45, these elements being serially connected, a peak voltmeter 46 and a D. C. amplifier 47. The peak voltmeter is connected to the output of the video amplifier 42 as in the foregoing embodiments, and is connected either directly or through the amplifier 47 to the variable gain receiver 41 and to the variable bias clipper or trip circuit 43. In this circuit variation in the peak amplitude of the received triggering signal is sensed by the peak voltmeter as in the foregoing embodiments and a signal proportionate thereto is applied to vary the gain of the receiver 41 and to vary the bias on the trip or clipper circuit 43, the combined effect being to increase the sensitivity of the system to variation in peak amplitude of the triggering signal and to more accurately eliminate any time delay error.

Figure 5:
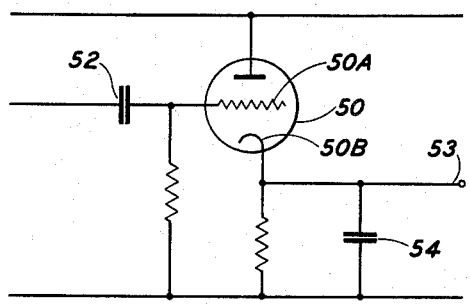
Fig. 5 is a partial circuit diagram of a single stage peak voltmeter circuit.

Fig. 5 is a circuit diagram of a single stage peak reading voltmeter circuit of the pulse stretcher type suitable for the purposes of the present invention. The output of the video amplifier in any of the above described embodiments is fed to the grid 50A of triode 50 through an input capacitor 52, the output of the cathode 50B charging a capacitor 54. The capacitor discharges through output lead 53 as the controlling signal either directly into the receiver or clipper circuit of the beacon station or through an intervening D. C. amplifier as illustrated. The circuit of Fig. 5 represents a conventional peak reading voltmeter and does not require extensive explanation.

Figure 6:
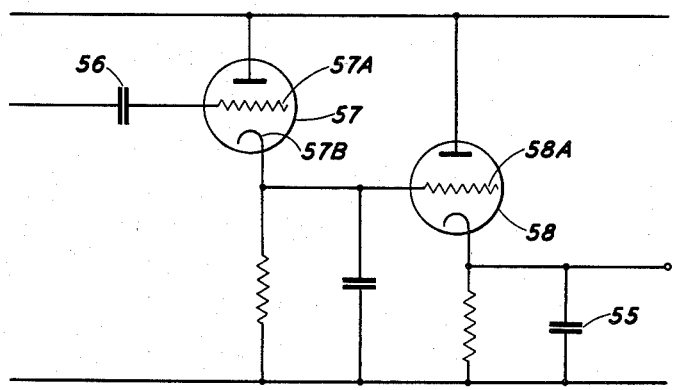
Fig. 6 is a partial circuit diagram of a two-stage peak voltmeter circuit.

In case the repetition rate of the system is low and the pulses are of short duration, two or more stages of pulse stretching may be required to give a voltage signal accurately proportional to the pulse peak height. Fig. 6 shows a pulse stretcher circuit in which two stages are cascaded, the input to the circuit being through an input capacitor 56 to grid 57A of triode 57 with the output of cathode 57B being fed to the grid 58A of a second stage triode 58. The circuits of Figs. 5 and 6 are, as above mentioned, conventional cathode follower circuits, the output capacitors 54, 55 in each case being charged to a value proportional to the peak amplitude of the pulse signal applied to it.

I claim:

1. In a radar transponder including a receiver, video amplifier, a biased trip circuit and transmitter operable to transmit a signal responsive to a received triggering signal, the combination comprising a peak reading voltmeter connected to sense the peak amplitude of the video amplifier output, and means responsive to said peak amplitude to maintain the relationship of peak amplitude to the trip circuit bias substantially constant.

2. In apparatus adapted to transmit a signal in response to a received triggering signal, means for holding the overall time delay constant for various amplitudes of the triggering signal including in combination, means for receiving the triggering signal, a trip circuit coupled to the receiving means for providing an output signal when the triggering signal exceeds a given threshold, a peak reading voltmeter coupled to the receiving means for providing a voltage indicative of the peak amplitude of the triggering signal, and means coupling the peak voltmeter to the trip circuit whereby the given threshold at which the trip circuit provides an output signal is varied so as to maintain a constant relationship between the peak amplitude of the triggering signal and the threshold at which the trip circuit provides an output signal.

3. In a radar transponder adapted to transmit a signal responsive to a received triggering signal and including a variable gain receiver, a video amplifier, a variable bias trip circuit, and a transmitter, the improvement which comprises a peak reading voltmeter circuit coupled to the output of the video amplifier for providing an output signal which varies in accordance with the peak amplitude of the individual triggering signals, and means coupled between the output circuit of the peak reading voltmeter circuit and the receiver and the trip circuit and responsive to the signal which varies in accordance with the peak amplitude of the individual triggering signals for varying the gain of the receiver inversely with the peak amplitude of the individual triggering signals and for varying the bias of the trip circuit to maintain the relationship of the peak amplitude of the individual triggering signals with respect to the threshold bias substantially constant.

4. In a radar transponder including a receiver, video amplifier, a biased trip circuit and transmitter operable to transmit a signal responsive to a received triggering signal, the combination comprising a peak reading voltmeter circuit connected to sense the peak amplitude of the video amplifier output, and means coupled between the output circuit of the peak reading voltmeter circuit and the receiver and responsive to the signal which varies in accordance with the peak amplitude of the individual triggering signals to maintain the relationship of the peak amplitude of the individual triggering signals with respect to the trip circuit bias substantially constant.

References Cited in the file of this patent

UNITED STATES PATENTS

| | | |
|---|---|---|
| 2,411,520 | Capen | Nov. 26, 1946 |
| 2,425,316 | Dow | Aug. 12, 1947 |
| 2,428,011 | Chatterjea et al. | Sept. 30, 1947 |
| 2,577,755 | Hargreaves et al. | Dec. 11, 1951 |
| 2,586,091 | Rinia | Feb. 19, 1952 |
| 2,594,916 | Gulnac | Apr. 29, 1952 |